United States Patent Office 3,374,479
Patented Mar. 19, 1968

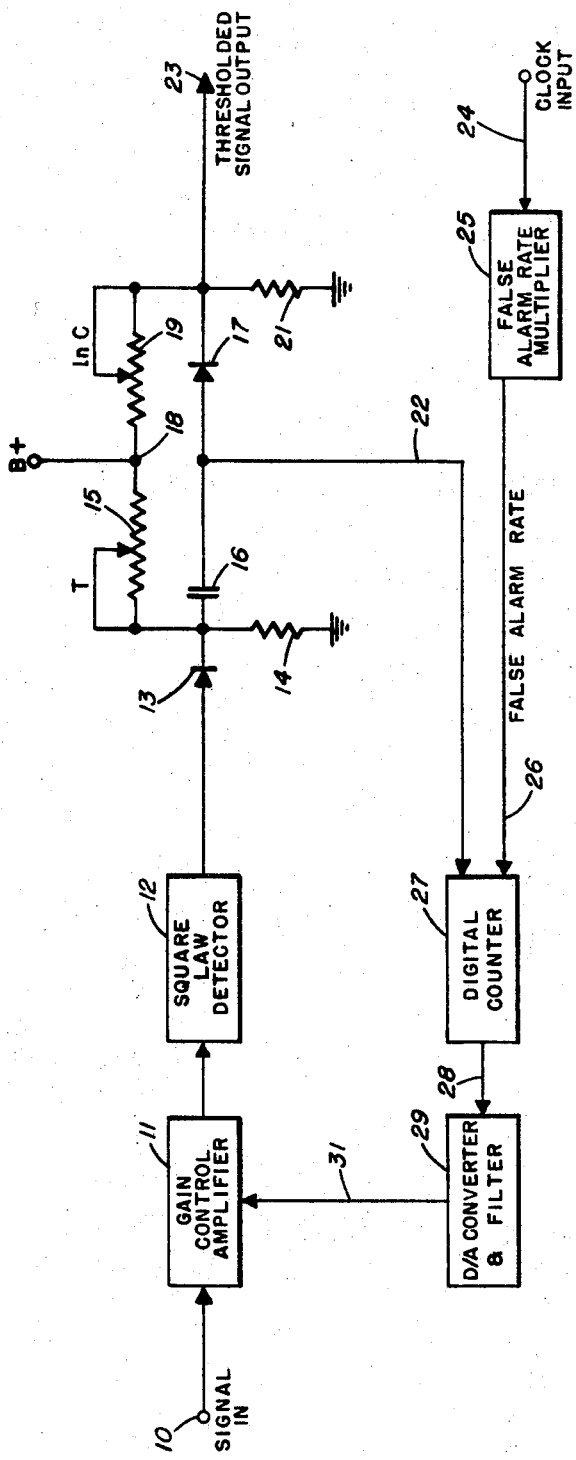

3,374,479
AUTOMATIC FALSE ALARM CONTROL
Thomas M. Moore, Severna Park, Md., assignor, by mesne assignments, to the United States of America as represented by the Secretary of the Navy
Filed Mar. 25, 1966, Ser. No. 538,484
6 Claims. (Cl. 343—7)

ABSTRACT OF THE DISCLOSURE

There is disclosed a system for preventing false alarm overloading of radar systems which are equipped with automatic detection circuitry for processing false alarm signals, utilizing an arrangement whereby a double threshold is used in order to more closely approximate the probability of false alarms.

---

The present invention relates to radar systems and, more particularly, to a system for preventing false alarm overloading of radar systems which are equipped with automatic detection circuitry for processing false alarm signals.

One of the major problems associated with automatic detection systems in a radar system is the difficulty of detecting true target returns such as those caused by aircraft as distinguished from false targets which may result from changes in noise environments such as jamming, chaff and weather. These high clutter environments may cause serious limitations in present day radar systems since a clutter situation could bring about total radar system breakdown due to the possible overloading its processing circuitry. Whenever this condition occurs, even very large real signals will be rejected due to the overload of false targets.

An object of the present invention is to provide an improved automatic false alarm control.

A further object of the present invention is to provide a radar system with a circuitry apparatus that prevents overloading of processing circuitry due to false alarms.

Still another object of the present invention is to provide a radar system with improved circuitry to provide a maximum of reliability and speed of response in maintaining a constant preset false alarm rate.

Another object of the present invention is to provide a thresholding technique that permits an accurate maintenance of extremely low false alarm rates.

A further object of the present invention is the provision of a circuitry that permits the maximum in speed of response to changes in noise environments such as jamming, chaff and weather.

Other objects, advantages and novel features of the present invention will become apparent from the following detailed description of the invention when considered in conjunction with the accompanying drawings wherein:

The figure illustrates a functional block diagram of the automatic false alarm control system.

Analysis of noise shows that it is essentially a random signal and in noise environments it is necessary to establish a threshold signal level to distinguish between those signals considered as noise signals and those signals which are considered real signals. The threshold circuitry is normally set at such a value that the real signals received will be distinguished over the noise signals present. Therefore, the rate at which the false alarms appear will depend upon the setting of the threshold level.

The most precise measurement of false alarm rate is obtained by an actual count of the threshold crossings or detections, but where there is the condition of very low false alarm rates, the number of false targets may be so low as to require very long filtering times for establishing control circuits or in some cases the number of real targets may approach or exceed the number of false target detections. Therefore, it is advantageous to control the actual false alarm rate by counting the threshold crossings of a considerably lower threshold in order to obtain a more continuous and uniform sample of noise pulses present.

Mathematically the probability of false alarm may be shown by $$P_{FA} = \int_T^\infty \frac{x}{\sigma^2} \epsilon^{-\frac{x^2}{2\sigma^2}} dx = \epsilon^{-\frac{x^2}{2\sigma^2}} \Big|_T^\infty = \epsilon^{-\frac{T^2}{2\sigma^2}} \quad (1)$$

where
$P_{FA}$=probability of false alarm
$\sigma$=intermediate frequency amplifier (RMS) noise level
$T$=intermediate frequency threshold level Thus, for a linear detector the probability of false alarm is shown to be dependent on the squares of the threshold setting and the IF RMS noise level.

For a double threshold system the ratios of the two probabilities of false alarm may be found by $$\frac{P_{FA1}}{P_{FA2}} = \frac{\epsilon^{-\frac{T_1^2}{2\sigma_1^2}}}{\epsilon^{\frac{T_2^2}{2\sigma_2}}} = \epsilon^{\frac{T_2^2 - T_1^2}{2\sigma^2}} \quad (2)$$

or $$C = \frac{T_2^2 - T_1^2}{2\sigma^2} \quad (3)$$

for a linear detector the equation would be $$T_2^2 = 2\sigma^2 C + T_1^2 \quad (4)$$

and in the case of a square law detector the square terms of Equation 4 drop out leaving $T_2$=(RMS noise level out of detector)(1 N of ratio of false alarm probabilities)+lower threshold level T (5)

Equation 5 may be maintained by a linear feedback loop controlling the noise level into the two fixed thresholds. This circuitry is shown with reference to the functional schematic of the figure.

An electrical signal input represented here as numeral 10 is electrically coupled to the input of grain control amplifier 11. The output of gain control amplifier 11 is electrically coupled to place its output signal into the input of square law detector 12. This electrical signal is detected and is electrically coupled to the anode side of diode 13. The cathode side of diode 13 is electrically coupled to one side of resistor 14 which has its other side connected to ground potential. The cathode side of diode 13 is also electrically coupled to ground potential by means of resistor 21 via a series capacitor 16 and diode 17. Variable resistance 15 is series coupled to variable resistor 19 and this network is electrically coupled in parallel circuitry arrangement with the network consisting of capacitor 16 and diode 17. The adjustable arms of resistor 15 and 19, respectively, are electrically connected to one end of the resistor so as to short out part of the resistance. A B+ potential is connected between the two variable resistors 15 and 19, respectively, at junction 18. This potential is obtained from a potential source, not shown. The threshold signal, output 23, is electrically coupled to the radar system from across resistor 21. A portion of the output signal is electrically coupled back to gain control amplifier 11 by coupling lead 22 from the cathode of diode 17 to the input of the digital up-down counter 27. A clock, not shown, is also coupled to the input of the up-down counter via electrical lead 24, false alarm rate multiplier 25 and false alarm rate electrical lead 26. The output of the up-down counter is electrically coupled to an input circuit of gain control amplifier 11 by means of electrical output lead 28, digital to analog converter and filter 29 and electrical output lead 31.

The electrical output that appears across resistor 21 is electrically coupled to the following circuitry by means of lead 23 and gives a signal which is representative of the threshold signal out.

In operation, the incoming signal at 10 is amplified predetermined amounts in gain control amplifier 11 and this amplified signal output is coupled to square law detector 12. The detected output is electrically coupled to a series diode capacitance network of diode 13, capacitor 16 and diode 17. Diode 13 is biased by means of the movable arm on adjustable resistance 15 and diode 17 is biased a predetermined amount by means of the adjustable arm of variable resistance 19. These two diodes 13 and 17, respectively, with their associated resistances represent a pair of threshold circuits. The first of these threshold circuits represented by diode 13, resistor 14 and resistor 15 is set at the IF threshold level (T) by means of adjustable arm on resistor 15 to provide a reasonable number of detections at the desired noise level out of the detector 12.

The second threshold circuitry is set by means of the adjustable arm on variable resistor 19, at the value of the 1 N of the false alarm ratios (typically $$1 \text{ N } \frac{\text{FAT}_1}{\text{FAT}_2} = 1 \text{ N } 100 = 4.6)$$

times the RMS thermal noise set for the system. By means of this adjustment the output of the second threshold provides the desired signal to noise ratio for the system.

A portion of the first threshold circuit signal output from diode 17 is used to couple a signal back to the gain control amplifier which causes it to maintain the proper signal level out of the square law detector 12 to provide the required probability of false alarm from the final threshold. These first level detections are coupled to the input of up-down counter 27 where their frequency or rate is compared to that of a dwell gated, preset, false alarm count rate which is obtained from the false alarm rate multiplier 25 and clock circuitry, which is not shown. The rate multiplier 25 is set to produce a clock pulse at its output at the approximate rate at which threshold crossings are anticipated by the setting of variable resistor 15. This rate can be accurately predicted if resistors 15 adjustable arm is set for a high probability of false alarm rate such as $10^{-2}$ to $10^{-4}$. The up-down counter 27 compares the two input rates received on electrical leads 22 and 26 and produces an output whose sense is such as to bring the number of threshold crossings into balance with the false alarm rate selected. This output is coupled by means of electrical lead 28 to digital analog converter and filter functional block 29. The output of the digital to analog converter is coupled to gain control amplifier 11 by means of electrical lead 31.

Obviously many modifications and variations of the present invention are possible in the light of the above teachings. It is therefore to be understood that within the scope of the appended claims the invention may be practiced otherwise than as specifically described.

What is claimed is:

1. False alarm control circuitry for providing a radar system with maximum reliability and speed of response in maintaining a constant, preset false alarm rate comprising:
    gain control means having first and second input means;
    square law detector means operatively connected to receive the output of said gain control means;
    threshold means electrically coupled to said square law detector for permitting only a predetermined amplitude of detected signal to pass and wherein said threshold means comprises a first and second threshold circuitry means electrically connected in series circuitry arrangement; and
    feedback circuitry electrically coupled between said second input means of said gain control means and said threshold means for controlling the signal amplitude output to said square law detector means.

2. The threshold means of claim 1 wherein said threshold means comprises:
    an adjustable bias circuitry;
    a first diode electrically coupled to said adjustable bias circuitry;
    a second diode electrically coupled to said adjustable bias circuitry; and
    capacitance means electrically coupling said first and second diode means in series circuitry relationship.

3. The threshold circuitry means of claim 2 wherein said adjustable bias circuitry of said first diode comprises series resistance network set to provide a bias that permits a reasonable number of detections at a predetermined noise level.

4. False alarm control circuitry for providing a radar system with maximum reliability and speed of response in maintaining a constant, preset false alarm rate comprising:
    gain control means having first and second input means;
    square law detector means operatively connected to receive the output of said gain control means;
    threshold means electrically coupled to said square law detector for permitting only a predetermined amplitude of detected signal to pass; and
    feedback circuitry electrically coupled between said second input means of said gain control means and said threshold means for controlling the signal amplitude output to said square law detector means and wherein said feedback circuit comprises:
        counter means having two inputs and an output,
        converter means electrically coupled between said output of said counter means and said gain control means,
        false alarm count rate multiplier means coupled to one of said inputs of said counter means, the other of said inputs of said counter means being coupled to said threshold means.

5. The feedback circuitry of claim 4 wherein said counter means comprises a digital counter that compares the signals on said two inputs and produces an output whose polarity is of such a value to bring the two signals into balance with one another.

6. The feedback circuitry of claim 4 wherein said converter means comprises a digital to analog converter.

References Cited

UNITED STATES PATENTS 2,519,359  8/1950  Dean _____ 325—397 X
3,312,969  4/1967  Halsted _____ 343—5

RODNEY D. BENNETT, *Primary Examiner.*

T. H. TUBBESING, *Assistant Examiner.*